United States Patent
Zhao

(10) Patent No.: US 7,792,020 B2
(45) Date of Patent: Sep. 7, 2010

(54) ADMISSION CONTROL UTILIZING BACKUP LINKS IN AN ETHERNET-BASED ACCESS NETWORK

(75) Inventor: Wei Zhao, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 231 days.

(21) Appl. No.: 12/097,803

(22) PCT Filed: Dec. 22, 2005

(86) PCT No.: PCT/SE2005/002000

§ 371 (c)(1),
(2), (4) Date: Jun. 17, 2008

(87) PCT Pub. No.: WO2007/073249

PCT Pub. Date: Jun. 28, 2007

(65) Prior Publication Data

US 2009/0257446 A1    Oct. 15, 2009

(51) Int. Cl.
*H04L 12/28* (2006.01)

(52) U.S. Cl. .......... 370/228; 370/229; 370/254; 370/395.2

(58) Field of Classification Search .......... None
See application file for complete search history.

(56) References Cited

U.S. PATENT DOCUMENTS

| | | | |
|---|---|---|---|
| 6,795,394 B1 * | 9/2004 | Swinkels et al. | 370/222 |
| 6,842,463 B1 | 1/2005 | Drwiega et al. | |
| 6,895,441 B1 * | 5/2005 | Shabtay et al. | 709/238 |
| 7,535,831 B2 * | 5/2009 | Phelps et al. | 370/228 |
| 2002/0105904 A1 * | 8/2002 | Hauser et al. | 370/218 |
| 2003/0063560 A1 * | 4/2003 | Jenq et al. | 370/216 |
| 2003/0147352 A1 * | 8/2003 | Ishibashi et al. | 370/248 |
| 2004/0082363 A1 | 4/2004 | Hosein | |
| 2005/0071484 A1 * | 3/2005 | Kang et al. | 709/230 |

FOREIGN PATENT DOCUMENTS

| | | | |
|---|---|---|---|
| EP | 1347603 A1 | 9/2003 | |
| EP | 1562390 A1 | 8/2005 | |

\* cited by examiner

*Primary Examiner*—Hong Cho
*Assistant Examiner*—Robert C Scheibel

(57) ABSTRACT

An admission control process in an Ethernet-based access network having both active links and idle backup links. When a service request is received in an access node, the process searches for a path of links to an access edge node with sufficient bandwidth to serve the service request. Active links are searched first. If a path of active links with sufficient bandwidth cannot be found, and the service is a unicast request, the process searches for a path that utilizes at least one idle backup link and has sufficient bandwidth to serve the service request.

17 Claims, 3 Drawing Sheets

ADMISSION CONTROL UTILIZING BACKUP LINKS IN AN ETHERNET-BASED ACCESS NETWORK

TECHNICAL FIELD OF THE INVENTION

The present invention relates generally to communications networks, and in particular, to an admission control process in an Ethernet-based access network.

DESCRIPTION OF RELATED ART

In the communications industry, both operators and customers have recognized the advantages of triple-play services (i.e., a bundled service for voice, data, and video services). To provision triple-play services to end users connected to a broadband access network, a well-defined Quality of Service (QoS) mechanism is essential. QoS support can be divided into two categories: absolute QoS and relative QoS, with both having their proper applications. For services with absolute QoS support, admission control is needed.

From a high level, an admission control process for an Ethernet based access network can be described as the following:

Boolean Bandwidth_admission_control (QoS_request, Topology).

This process takes two input parameters, QoS_request and Topology. The return value of the process will be "true" when there is sufficient bandwidth to admit an admission request, or "false" where the request must be rejected due to insufficient bandwidth. When checking the available bandwidth, the process looks at the source and destination Mac addresses included in the QoS-request parameter, and determines the path in the network between the source and the destination using the information in the Topology parameter.

The Ethernet-based access network may have different topologies, but at any given time, the active links in an Ethernet based access network always form a tree structure. This is because when there is an active ring in the access network, broadcast traffic will be transmitted again and again along the ring and will eventually flood the network. So traditionally, there are a number of backup links in the access network that are activated only when an active link fails, which results in a new tree structure. The backup links are usually idle, i.e., they do not share the traffic load. The bandwidth admission control process only checks the active links along the path. Thus under certain conditions, the admission control process may reject an admission request because the active links are heavily loaded, while the backup links are idle without any traffic load at all. This is a waste of network resources.

Accordingly, there is a need for an improved an admission control process that overcomes the shortcomings of the prior art. The present invention provides such a process.

SUMMARY OF THE INVENTION

In one aspect, the present invention is directed to an admission control process in an access network having both active links and idle backup links. The process includes receiving a service request in the access network, and searching for a path of links with sufficient bandwidth to serve the service request. The searching step includes searching both the active links and the idle backup links in the access network. The service request is admitted if a path with sufficient bandwidth to serve the service request is found. The process may search first for a path of active links having sufficient bandwidth to serve the service request, and then search for a path having at least one idle backup link and sufficient bandwidth if a path of active links with sufficient bandwidth is not found.

In another aspect, the present invention is directed to an admission control process in an Ethernet-based access network having both active links and idle backup links. The process includes receiving a service request in the access network; searching for a path of active links with sufficient bandwidth to serve the service request; and if a path of active links with sufficient bandwidth to serve the service request is found, admitting the service request. If a path of active links with sufficient bandwidth to serve the service request is not found, the process searches for a path with sufficient bandwidth to serve the service request among paths having at least one idle backup link. If a path having at least one idle backup link and sufficient bandwidth to serve the service request is not found, the service request is rejected. If a path having at least one idle backup link and sufficient bandwidth to serve the service request is found, the service request is admitted. Paths with idle backup links may be searched only if the service request is a unicast request.

DETAILED DESCRIPTION OF EMBODIMENTS

In an Ethernet-based access network, the backup links are idle mainly because of the broadcasting traffic. The present invention uses the backup links to augment the active links when the active links are heavily loaded, thus improving the network performance.

The bandwidth admission control process of the present invention first follows the standard admission process to determine whether there is available bandwidth on active links along the path to handle a new unicast admission request. If enough bandwidth is found on the active path, the process returns "true". However, when there is insufficient bandwidth available on the active path for the unicast request, instead of returning "false" and rejecting the service request, the present invention searches for another path utilizing the backup links. The invention searches from the network node attached to the failing link to the destination node. Several such paths may exist, and the admission control process checks available bandwidth on all paths, starting with the path having the least number of hops. If available bandwidth is found on one of the paths, the admission control process returns "true" and instructs the affecting node to change its forwarding table and switch follow-up traffics along the newly found path. If no paths are found with enough bandwidth, or an extra path does not exist, the admission control process returns "false" and rejects the service request.

Figure 1:
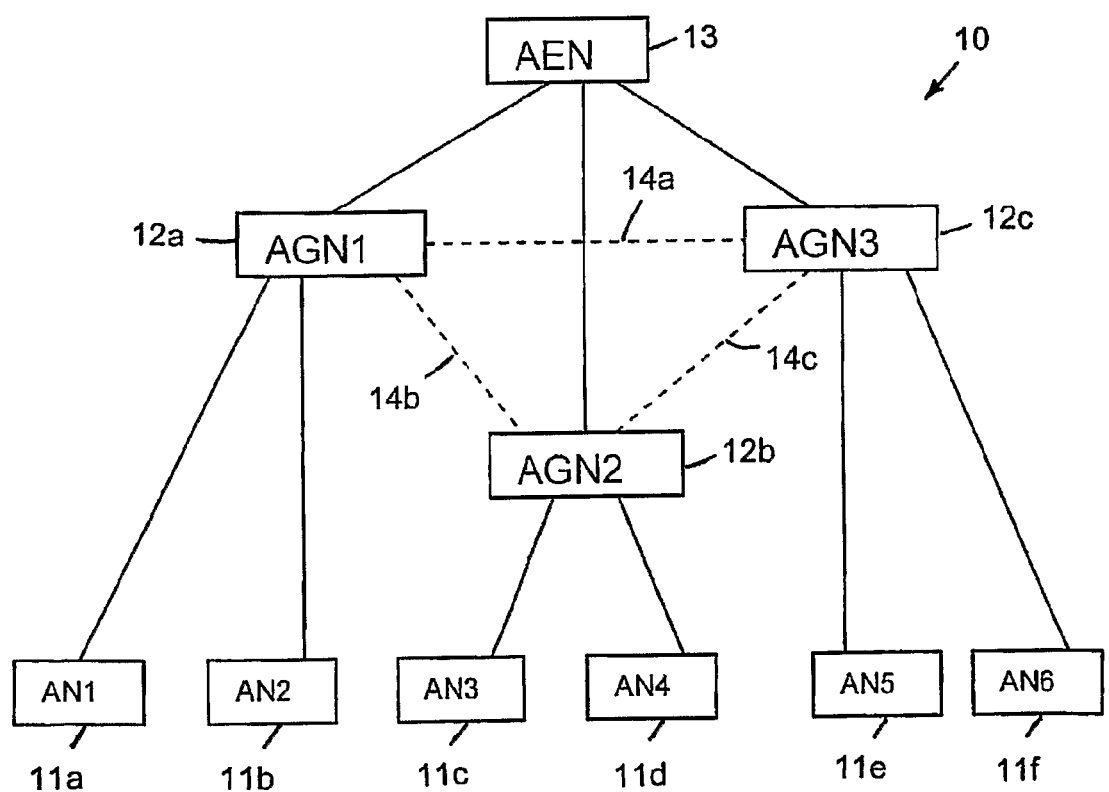
FIG. 1 is a simplified block diagram of an exemplary access network topology suitable for implementing the present invention.

FIG. 1 is a simplified block diagram of an exemplary access network topology 10 suitable for implementing the present invention. In the network, access nodes (AN1-AN6) 11a-11f are connected to aggregation nodes (AGN1-AGN3) 12a-12c. The aggregation nodes and the access edge node (AEN) 13 are connected in a fully meshed way. Thus three backup links 14a-14c, depicted by dotted lines, are provided. Active links within the network are depicted by solid lines. QoS admission requests are received through the access nodes 11.

The algorithm utilized by the bandwidth admission control process of the present invention is as follows:

Boolean Bandwidth_admission_control (QoS_request, Topology)

There are two input parameters, the QoS_request and Topology. The detailed structures of the two parameters are:

```
QoS_request:
    ServiceType: Unicast/Multicast/Broadcast;
/* The algorithm checks backup links only for Unicast service */
    SourceMacAddress; DestinationMacAddress;
/* This address pair is used to find the corresponding network nodes */
    MinBandwidth; PeakBandwidth;
/* The bandwidth requirement of the service */
    MaxDelay; MaxJitter; etc
/* Other parameters are not considered in this algorithm */
Topology:
    NodeAddress[1..n]; /* Mac address of each node in the network
    Links[1..m]: /* All links in the network */
        EndNode1: NodeAddress
        EndNode2: NodeAddress
/* The addresses of the two nodes to which the link is connected */
        Capacity; /* Total bandwidth */
        AvailableCapacity; /* Currently Available Bandwidth */
        Status: Active/Backup; /* If the link is in use or idle */
```

Figure 2:
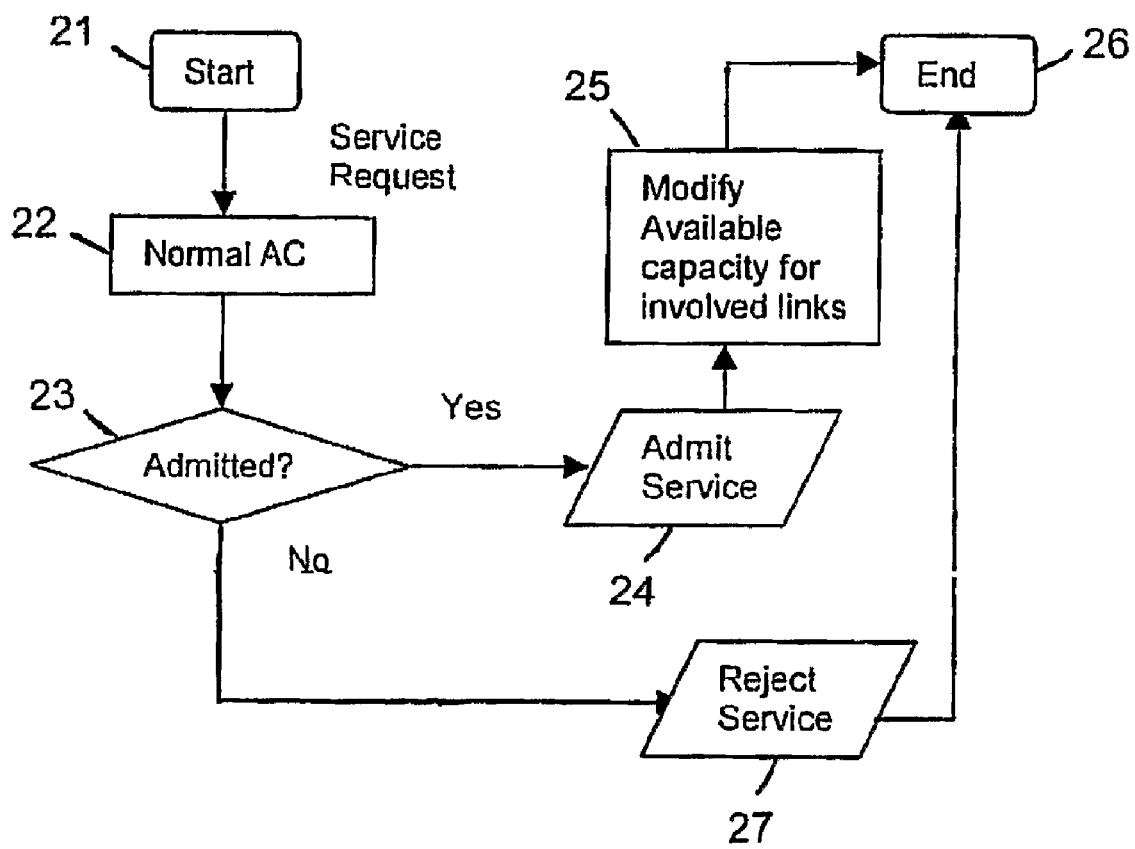
FIG. 2 is a flow chart illustrating an existing access control process.

FIG. 2 is a flow chart illustrating an existing access control process. The process starts at step 21 where a service request is received from an access node. The service request includes a QoS-request parameter. At step 22, the process enters the normal admission control process. The process looks at the source and destination Mac addresses included in the QoS-request parameter, and determines whether the active links along the path have sufficient bandwidth to handle the new admission request. The process only checks the active links along the path. If all of the links have sufficient bandwidth to handle the new admission request, the request is admitted. If any of the active links have insufficient bandwidth, the admission request is rejected.

At step 23, it is determined whether bandwidth conditions enable the new admission request to be admitted. If so, the process moves to step 24 and admits the service request. At step 25, the process modifies the available capacity for the involved links. The process then ends at step 26. However, if it was determined at step 23 that bandwidth conditions do not enable the new admission request to be admitted, the process moves to step 27 where the service request is rejected. The process then ends at step 26.

Figure 3:
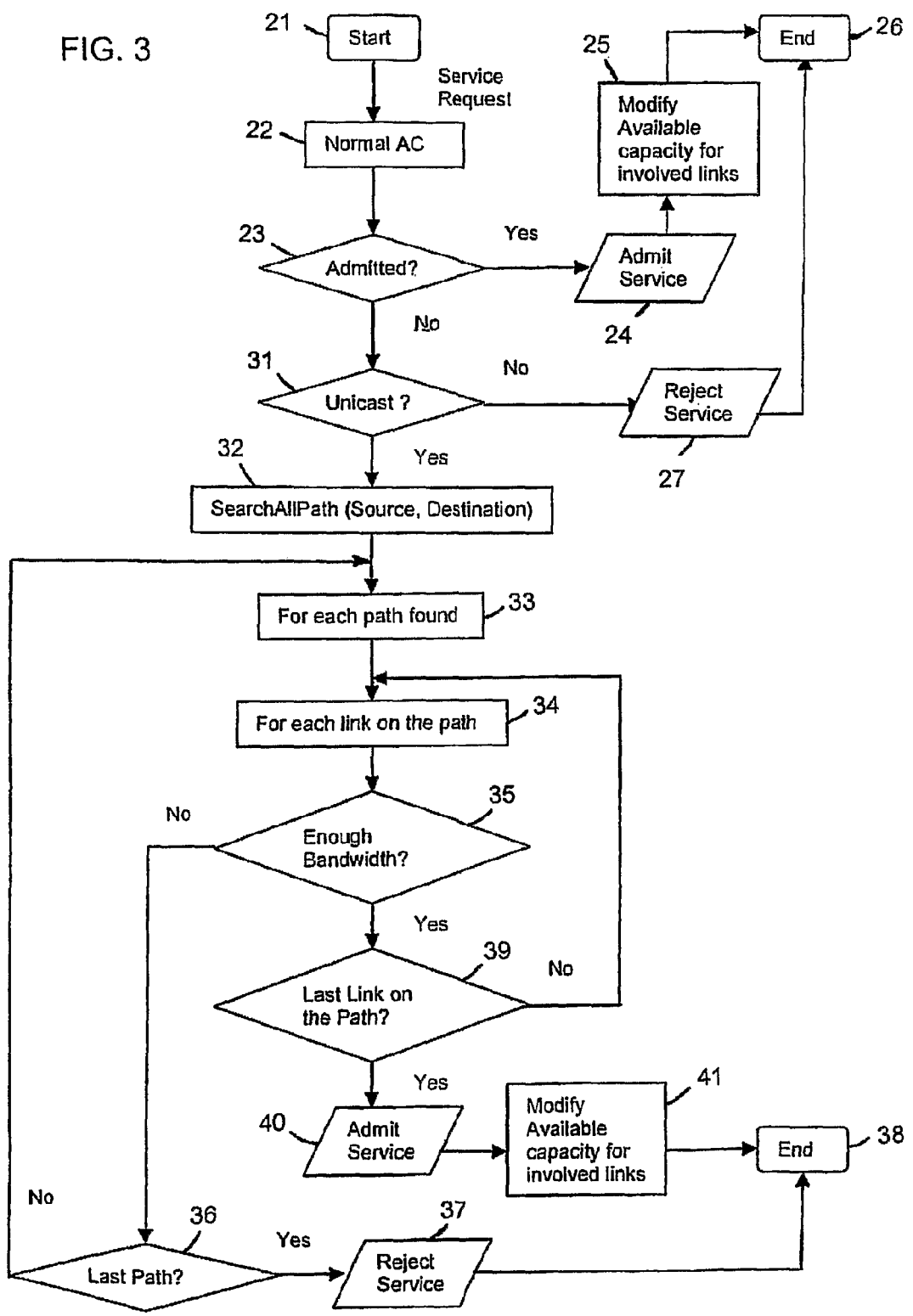
FIG. 3 is a flow chart illustrating the steps of a preferred embodiment of the process of the present invention.

FIG. 3 is a flow chart illustrating the steps of a preferred embodiment of the process of the present invention. As noted above, the bandwidth admission control process of the present invention first follows the standard admission process (steps 21-23) to determine whether there is available bandwidth on active links along the path to handle a new admission request. If enough bandwidth is found on the active path, the process admits the new service request at step 24, modifies the available capacity for the involved links at step 25, and ends at step 26.

However, if it is determined at step 23 that there is insufficient bandwidth to handle the new request, the process moves to step 31 where it is determined whether the new request is a unicast request. If not, the process moves to step 27 where the service request is rejected. The process then ends at step 26.

However, if the service request is a unitcast request, the process moves to step 32 and searches all paths, including the backup links, for a path with sufficient bandwidth. The invention searches from the network node attached to the failing link (i.e., the link with insufficient bandwidth) to the destination node. Several such paths may exist, and the admission control process checks available bandwidth on all paths, starting with the path having the least number of links. At step 33, the process individually analyzes each path found. At step 34, the process checks the bandwidth capacity of each link on a given path. At step 35, it is determined whether the link currently being analyzed has sufficient bandwidth to handle the new request. If not, the process moves to step 36 and determines whether the path currently being analyzed is the last path. If so, then no paths have been found with sufficient bandwidth, or an extra path does not exist. Therefore, the process moves to step 37 where the new unicast request is rejected. The process then ends at step 38.

However, if it is determined at step 35 that the link currently being analyzed has sufficient bandwidth to handle the new request, the process moves to step 39 where it is determined whether this link is the last link on the path currently being analyzed. If not, the process returns to step 34 and continues to analyze the remaining links on the analyzed path until all links have been analyzed or an link with insufficient bandwidth is discovered.

Once all links on a given path have been determined to have sufficient bandwidth, the process moves to step 40 where the unicast request is admitted. At step 41, the process modifies the available capacity for the involved links. The process also instructs the affecting node to change its forwarding table and switch follow-up traffic along the newly found path. The process then ends at step 38.

It is clear from FIG. 3 that the heaviest part of the process is to search for all available paths between any source and destination pairs. Several steps may be taken to optimize this part of the process. First, since the network topology will not change often, the path, including all links, can be calculated in advance when the network stabilizes and is stored statically in the system. That way, the searching and calculation do not have to be performed every time a service request arrives. This dramatically reduces the resources and time needed for the admission control. When there is a network topology change, or when link failure occurs, all paths are re-calculated again after the network stabilizes again. Since Ethernet-based access networks are quite stable, such recalculations should be rare.

Another possible optimization lies in the fact that in the access network, all requests enter the network through the access nodes 11a-11f and leave the network via the access edge node 13. Therefore, the path calculation is only needed between access node/access edge node pairs instead of all node pairs in the network. This further reduces the time and resources needed for path calculation.

A third optimization provides improved network performance. After all paths between a given pair are found, the paths are sorted based on a weighting and are stored in a weight-descendent or ascendant manner. The weighting may be based on any factor of interest to the operator, such as number of hops, link capacities, and the like. Thereafter, when the admission control process searches for an available path for a service request, the process analyzes the more favorable (weighted) path first.

The complexity of the present invention resides heavily in the path searching. To search all possible paths between a given pair of a weighted graph, a number of existing algorithms, such as K-Shortest Path (KSP) and Maximum Flow (MF) may be applied. Among them, the KSP algorithm provides a rather good approximation of finding all possible paths. Another advantage of KSP is that its output is already sorted according to the pre-defined weight, which saves the sorting time as well. In the worst case, the admission control process provides a complexity of O(n log(n)), where n is the number of nodes in the network. However, the complexity is mitigated if the process is optimized so that path searching is not required every time a service request arrives. Additionally, the searching is not required once the network is stable. Given the highly reliable nature of Ethernet-based networks today (over 99:9%), the actual complexity the process adds to the system is negligible.

Thus, the bandwidth admission control process of the present invention improves network resource utilization by making use of the backup links in the network for unicast service requests. The process improves network performance by enabling additional service requests to be admitted into the network that would otherwise be rejected using the traditional bandwidth admission control process. The complexity of the present invention does not increase with increasing numbers of services. The complexity remains constant most of the time, and consumes additional computational power only when the network changes and converges again.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. An admission control process in an access network having both active links and idle backup links, said process comprising the steps of:
    receiving a service request in the access network;
    searching for a path of links with sufficient bandwidth to serve the service request, said searching step including:
        searching first for a path of active links having sufficient bandwidth to serve the service request; and
        if a path of active links with sufficient bandwidth is not found and if the service request is a unicast request, searching for a path having at least one idle backup link and sufficient bandwidth to serve the service request; and
    admitting the service request if a path with sufficient bandwidth to serve the service request is found.

2. The process according to claim 1, wherein the access network is an Ethernet-based access network.

3. An admission control process in an access network having both active links and idle backup links, said process comprising the steps of:
    receiving a service request in the access network;
    searching for a path of links with sufficient bandwidth to serve the service request, said searching step including:
        searching first for a path of active links having sufficient bandwidth to serve the service request; and
        if a path of active links with sufficient bandwidth is not found, searching for a path having at least one idle backup link and sufficient bandwidth to serve the service request; and
        admitting the service request if a path with sufficient bandwidth to serve the service request is found;
    wherein the access network includes a plurality of access nodes where service requests enter the access network and an access edge node where service requests exit the access network, wherein the searching step includes searching only paths that connect the access edge node with the access node where the service request enters the network.

4. The process according to claim 3, further comprising, prior to receiving the service request, the steps of determining and storing information regarding all possible paths from the plurality of access nodes to the access edge node for a particular network topology, wherein the stored path information is utilized to search for paths from the access node where the service request enters the access network to the access edge node when the service request is received.

5. The process according to claim 4, wherein the steps of determining and storing information regarding all possible paths from the plurality of access nodes to the access edge node are performed following a topology change or link failure.

6. The process according to claim 4, further comprising sorting and storing the path information based on a weighting factor, wherein the searching steps include searching for a path with sufficient bandwidth beginning first with the path most favorably weighted.

7. The process according to claim 6, wherein the weighting factor is operator defined.

8. The process according to claim 7, wherein the weighting factor is based at least on the number of links in each path and the link capacity of each link.

9. An admission control process in an access network having both active links and idle backup links, said process comprising the steps of:
    receiving a service request in the access network;
    searching for a path of active links with sufficient bandwidth to serve the service request;
    if a path of active links with sufficient bandwidth to serve the service request is found, admitting the service request;
    if a path of active links with sufficient bandwidth to serve the service request is not found:
    determining whether the service request is a unicast request;
    rejecting the service request if the service request is not a unicast request; and
    if the service request is a unicast request:
    searching for a path with sufficient bandwidth to serve the service request among paths having at least one idle backup link;
    if a path having at least one idle backup link and sufficient bandwidth to serve the service request is not found, rejecting the service request; and
    if a path having at least one idle backup link and sufficient bandwidth to serve the service request is found, admitting the service request.

10. The process according to claim 9, wherein the access network is an Ethernet-based access network.

11. The process according to claim 9, wherein the access network includes a plurality of access nodes where service requests enter the access network and an access edge node where service requests exit the access network, wherein the searching steps include searching only paths that connect the access edge node with the access node where the service request enters the network.

12. The process according to claim 11, further comprising, prior to receiving the service request, the steps of determining and storing information regarding all possible paths from the plurality of access nodes to the access edge node for a particular network topology, wherein the stored path information is utilized to search for paths from the access node where the service request enters the access network to the access edge node when the service request is received.

13. The process according to claim 12, wherein the steps of determining and storing information regarding all possible paths from the plurality of access nodes to the access edge node are performed following a topology change or link failure.

14. The process according to claim 12, further comprising sorting and storing the path information based on a weighting factor, wherein the searching steps include searching for a path with sufficient bandwidth beginning first with the path most favorably weighted.

15. The process according to claim 14, wherein the weighting factor is operator defined.

16. The process according to claim 15, wherein the weighting factor is based at least on the number of links in each path and the link capacity of each link.

17. An admission control system in an access network having both active links and idle backup links, said system comprising:

an access node for receiving a service request in the access network;

means for searching for a path of links between the access node and an access edge node having sufficient bandwidth to serve the service request, said searching means including:

means for searching first for a path of active links having sufficient bandwidth to serve the service request; and means, responsive to a determination that a path of active links with sufficient bandwidth is not found, for searching for a path having at least one idle backup link and sufficient bandwidth to serve the service request; and means for admitting the service request if a path with sufficient bandwidth to serve the service request is found;

wherein the means for searching for a path having at least one idle backup link and sufficient bandwidth to serve the service request performs the searching only if the service request is a unicast request.

* * * * *

UNITED STATES PATENT AND TRADEMARK OFFICE
CERTIFICATE OF CORRECTION

PATENT NO.        : 7,792,020 B2                                        Page 1 of 1
APPLICATION NO.   : 12/097803
DATED             : September 7, 2010
INVENTOR(S)       : Zhao It is certified that error appears in the above-identified patent and that said Letters Patent is hereby corrected as shown below:

IN THE SPECIFICATIONS:

In Column 3, Line 64, delete "unitcast" and insert -- unicast --, therefor.

In Column 5, Line 2, delete "O(n log(n))," and insert -- O(nlog(n)), --, therefor.

Signed and Sealed this
Fifteenth Day of February, 2011

David J. Kappos
*Director of the United States Patent and Trademark Office*